Inventor
Arthur F. Mapes
By Clarence A. O'Brien and Hyman Berman
Attorneys

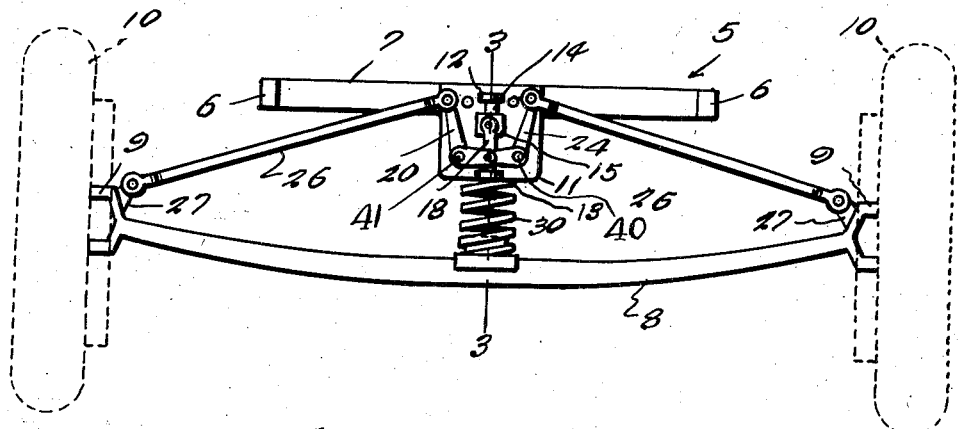
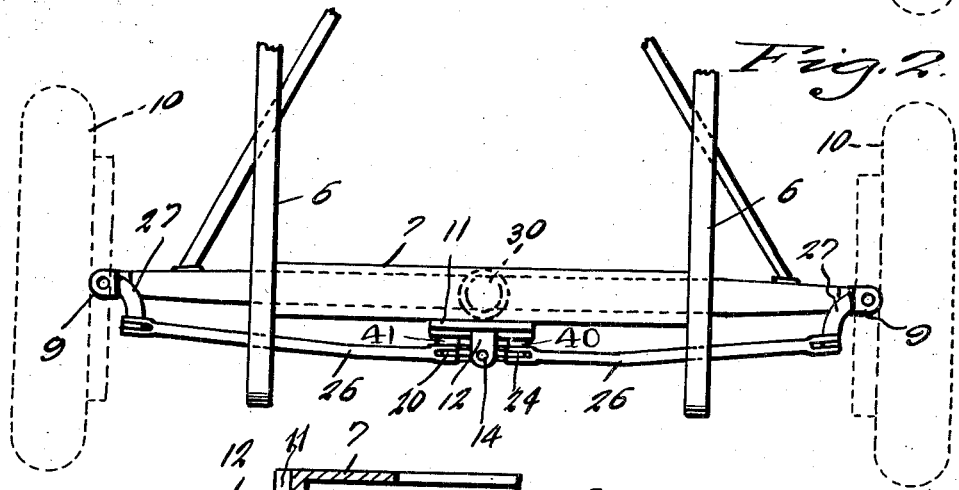
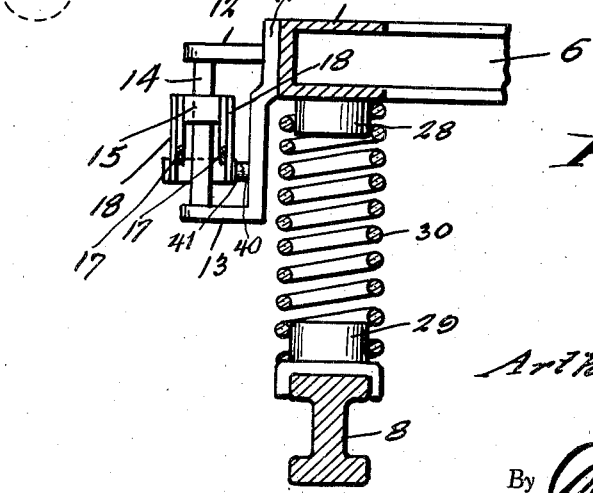

Jan. 3, 1939.  A. F. MAPES  2,142,613
AUTOMOBILE FRAME MOUNTING
Filed April 14, 1936  3 Sheets-Sheet 3

Inventor
Arthur F. Mapes
By Clarence A. O'Brien and
Hyman Berman
Attorneys

Patented Jan. 3, 1939

2,142,613

UNITED STATES PATENT OFFICE 2,142,613

AUTOMOBILE FRAME MOUNTING

Arthur F. Mapes, Union N. Y.

Application April 14, 1936, Serial No. 74,324

1 Claim. (Cl. 280—112)

This invention appertains to new and useful improvements in means for mounting automobile chassis frames.

The principal object of the present invention is to provide a novel mounting adapted to hold the axle of an automobile or other vehicle in its proper position transversely independently of its springs, thus allowing the use of soft coiled springs instead of flat springs.

Another important object of the invention is to eliminate side sway or rolling over of the automobile body on its springs when taking curves at high speed.

Various other important objects and advantages of the invention will become apparent to the reader of the following specification.

In the drawings:

Figure 1 represents a front elevational view of the mounting;

Figure 2 represents a fragmentary top plan view of the mounting;

Figure 3 is an enlarged vertical section on line 3—3 of Figure 1;

Figure 6:
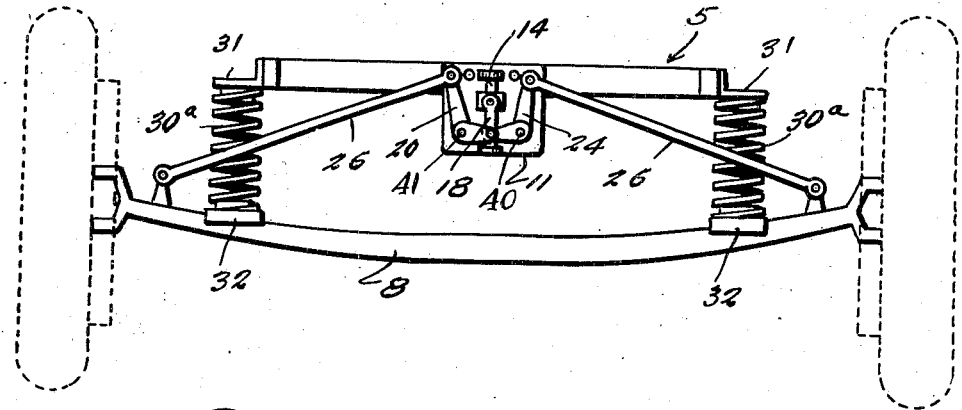
Figure 6 is a front elevational view of a modified form of the invention.
Figure 4:
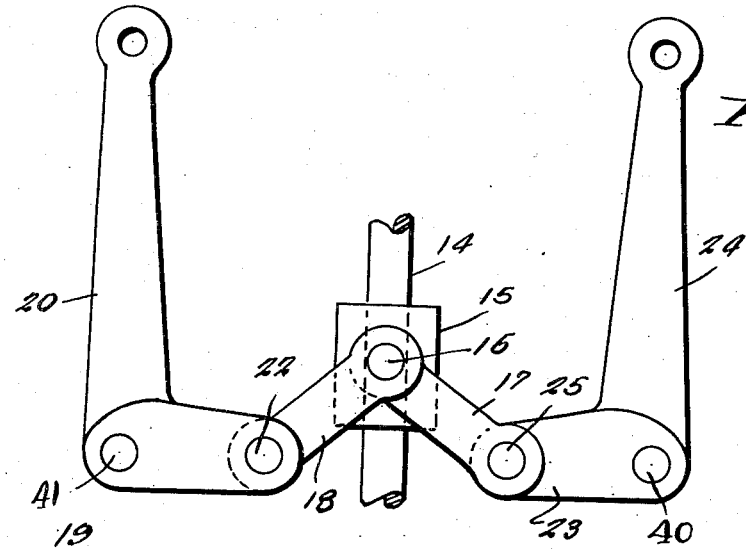
Figure 4 is a fragmentary enlarged elevational view of the lever arrangement.
Figure 5:
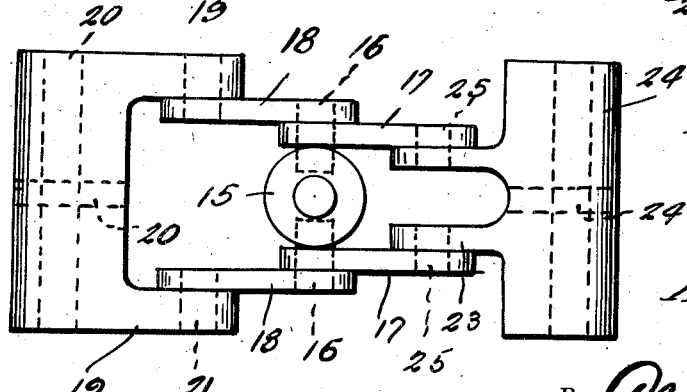
Figure 5 is a bottom plan view of the structure shown in Figure 4.

Referring to the drawings wherein like numerals designate like parts, it can be seen in Figure 1 that numeral 5 refers to the chassis frame consisting of the side bar 6—6 and the front cross-bars 7. Numeral 8 represents the usual front axle with the knuckles 9 at the ends thereof to which the wheels 10 connect.

A plate 11 is secured at its upper edge to the cross-bar 7 and has a pair of vertically spaced arms 12—13 thereon between which the rod 14 is disposed and secured at its ends. Slidable on this rod 14 is the collar 15 which has laterally projecting pintles 16—16 projecting through the adjacent overlapping and apertured ends of the links 17—18. These links 17—18 are located at the inner side and outer side of the collar 15. The outer ends of the links 18 interlap with the leg portions 19 of the bell crank 20 and suitable pins 21 pivotally connect the same with the bell crank, while the outer ends of the links 17 overlap the leg portions 23 of the bell crank 24 and suitable pins 25 are employed to pivotally connect these links to the bell crank 24.

The bell cranks 20 and 24 are fulcrumed on studs 40 and 41, respectively, carried by and extending from the plate 11.

The upper ends of these bell cranks 20—24 are apertured and pivotally connected to connecting rods 26 which pivotally connect at their outer ends to the lugs 27 on the end portions of the axle 8.

A boss 28 depends from the cross member 7 of the chassis frame while a boss 29 is mounted on the intermediate portion of the axle bar 8. A coiled compressible spring 30 has its upper convolutions engaged with the boss 28 and its lower convolutions engaged over the boss 29.

As is shown in Figure 6, the lever arrangement described from numeral 11 to numeral 27 in Figure 1 is the same, however the springs 30ª—30ª are employed instead of spring 30, and these springs 30ª—30ª are interposed between hanger members 31 on the side bar 6 of the chassis frame and boss carrying plates 32 on the axle bar 8. In other words, the only change from Figure 1 is that two springs are employed for each lever arrangement instead of the one shown in the form of Figure 1.

Figure 7:
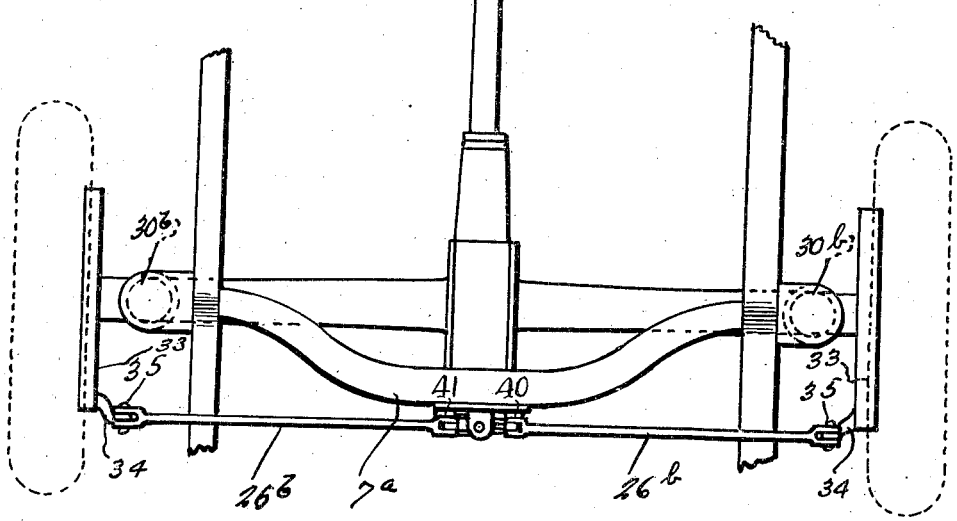
Figure 7 is a fragmentary top plan view of the modified form shown in Figure 8.
Figure 8:
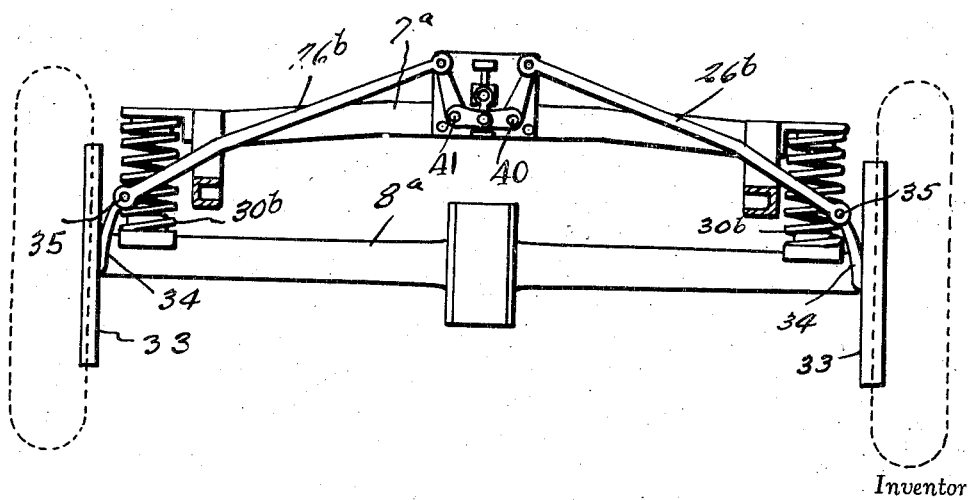
Figure 8 is an elevational view of the spring mount for the rear end of the vehicle of the character shown in Figure 7.

Referring to Figures 7 and 8, it can be seen that due to the construction of the rear portion of an automobile, it is necessary to somewhat vary the construction to accommodate various fixtures on the rear portion of the automobile. In other words, the cross bar 7ª on the chassis has its intermediate portion bulged rearwardly to avoid the intermediate portion of the axle housing 8ª. At the point where this cross bar 7ª connects to the side rails of the chassis 5, the springs 30ᵇ are mounted in the same manner as the springs 30ª.

The connecting rod 26ᵇ shown in Figures 7 and 8 axially connect the brake housings 33 by connecting to short arms 34 on the brake housing pivotally at 35.

In the operation of the device it will be apparent that the bell crank levers 20 and 24 are so connected with the links 17 and 18 and the rods 26 that if movement of the axle of the car relative to the frame causes the lever 24 to rotate counterclockwise, then the opposite lever must rotate in a clockwise direction and vice versa. Presuming that the springs are compressed so that the axle moves toward the frame the rods connecting the bell crank levers to the axle would be subjected to a thrust. Presuming this thrust is greater on the right hand side of the car, as viewed with respect to the figures in the drawings, the bell crank lever 24 would be rotated in a counterclockwise direction and the bell crank lever 20 would be caused to rotate in a clockwise direction. Since these levers rotate in opposite directions and since they move freely in opposite directions they would offer no resistance to the pressure and the axle consequently would be allowed to move toward the frame.

Presuming the axle is moving away from the frame the levers would then be subjected to strain. Consequently the right-hand lever would rotate in a clockwise direction while the left hand lever would move in a counterclockwise direction. Under conditions where the frame is subjected to a force which attempts to move the frame transversely away from its central position, as in a direction toward the right, the right hand rod linking the axle to the lever would then be subjected to thrust whereas the left hand rod would be subjected to strain. Consequently the right hand rod would tend to rotate the lever 24 to which it is attached in a counterclockwise direction whereas the left hand rod would tend to rotate the lever 20 in a clockwise direction. Consequently the force subjected to the frame would be resisted and no motion would occur. Consequently the frame may move freely up and down with respect to the axle but is resisted from movement transversely toward the right or left.

While the foregoing specification sets forth the invention in specific terms, it is to be understood that numerous changes in the shape, size, and materials may be resorted to without departing from the spirit and scope of the invention as claimed hereinafter.

Having thus described the invention, what is claimed as new is:

In combination, an automobile axle, a chassis frame, coiled compressible spring means interposed between the chassis frame and the axle, a plate mounted on the chassis frame, a pair of bell crank rods pivotally connected with the bell cranks and the end portions of the axle, swingably mounted on said plate a pair of outwardly projecting arms on the plate, a rod interposed between the said arms, a collar slidable on the rod, said collar being provided with lateral pintles, and link members extending from the bell cranks and being swingable on the said pintles.

ARTHUR F. MAPES.